United States Patent
Shibata

(10) Patent No.: US 12,196,718 B2
(45) Date of Patent: Jan. 14, 2025

(54) EVALUATION METHOD

(71) Applicant: SUMITOMO RUBBER INDUSTRIES, LTD., Kobe (JP)

(72) Inventor: Yusuke Shibata, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 279 days.

(21) Appl. No.: 17/568,121

(22) Filed: Jan. 4, 2022

(65) Prior Publication Data

US 2022/0244151 A1 Aug. 4, 2022

(30) Foreign Application Priority Data

Feb. 2, 2021 (JP) .................................. 2021-015097

(51) Int. Cl.
*G01N 3/08* (2006.01)
*G01L 1/24* (2006.01)

(52) U.S. Cl.
CPC ................ *G01N 3/08* (2013.01); *G01L 1/241* (2013.01); *G01L 1/248* (2013.01); *G01N 2203/0017* (2013.01)

(58) Field of Classification Search
CPC ............ G01N 3/08; G01L 1/241; G01L 1/248
See application file for complete search history.

(56) References Cited

U.S. PATENT DOCUMENTS

| | | | |
|---|---|---|---|
| 4,812,036 A | 3/1989 | Inoue | |
| 2007/0055029 A1* | 3/2007 | Suzuki | B60C 1/00 526/335 |
| 2013/0123418 A1* | 5/2013 | Araujo Da silva | C08L 9/06 264/175 |
| 2018/0113036 A1* | 4/2018 | Uemura | G01B 11/16 |
| 2019/0339815 A1 | 11/2019 | Buyuksahin | |
| 2021/0380786 A1* | 12/2021 | Nakatani | C08C 19/25 |

FOREIGN PATENT DOCUMENTS

| | | |
|---|---|---|
| CN | 111521307 A | 8/2020 |
| EP | 3 581 488 A1 | 10/2019 |
| EP | 3 683 259 B1 | 12/2021 |
| EP | 3 988 609 B1 | 7/2023 |
| JP | 64-15640 A | 1/1989 |
| JP | 7-142473 A | 6/1995 |
| JP | 9-297101 A | 11/1997 |
| JP | 2004-163311 A | 6/2004 |
| JP | 2009-145148 A | 7/2009 |
| JP | 2009-168562 A | 7/2009 |
| JP | 2010-6952 A | 1/2010 |
| JP | 2015-206743 A | 11/2015 |
| JP | 2016-80627 A | 5/2016 |
| JP | 2020-34284 A | 3/2020 |
| JP | 2020-111675 A | 7/2020 |

* cited by examiner

*Primary Examiner* — Hugh Maupin
(74) *Attorney, Agent, or Firm* — Birch, Stewart, Kolasch & Birch, LLP

(57) ABSTRACT

Provided is an evaluation method capable of evaluating stress on a bond which is difficult to detect by Raman spectroscopy. The present disclosure relates to an evaluation method including using infrared absorption spectra measured on a rubber specimen under application of no tensile force and under application of a tensile force to calculate an amount of peak shift caused by application of the tensile force, and evaluating stress in the rubber specimen from the amount of peak shift.

5 Claims, 3 Drawing Sheets

EVALUATION METHOD

TECHNICAL FIELD

The present disclosure relates to a method for evaluating a rubber specimen.

BACKGROUND ART

It has been known to evaluate stress in micro areas of polymers using Raman spectroscopy (see, for example, Patent Literatures 1 to 3).

CITATION LIST

Patent Literature

Patent Literature 1: JP S64-15640 A
Patent Literature 2: JP 2009-145148 A
Patent Literature 3: JP 2009-168562 A

SUMMARY OF DISCLOSURE

Technical Problem

In the evaluation of stress in a rubber specimen, Raman spectroscopy can strongly detect highly symmetric bonds, such as C=C or S—S bonds, but can hardly detect bonds in which the charge is highly polarized, such as C=O or C—H bonds. Thus, it has been difficult with Raman spectroscopy-based methods to evaluate stress on the latter bonds.

The present disclosure aims to solve the above problem and provide an evaluation method capable of evaluating stress on a bond which is difficult to detect by Raman spectroscopy.

Solution to Problem

The present disclosure relates to an evaluation method, including using infrared absorption spectra measured on a rubber specimen under application of no tensile force and under application of a tensile force to calculate an amount of peak shift caused by application of the tensile force, and evaluating stress in the rubber specimen from the amount of peak shift.

Advantageous Effects of Disclosure

The evaluation method according to the present disclosure includes using infrared absorption spectra measured on a rubber specimen under application of no tensile force and under application of a tensile force to calculate an amount of peak shift caused by application of the tensile force, and evaluating stress in the rubber specimen from the amount of peak shift. Such a method is capable of evaluating stress on a bond which is difficult to detect by Raman spectroscopy.

DESCRIPTION OF EMBODIMENTS

The present disclosure provides an evaluation method which includes using infrared absorption spectra measured on a rubber specimen under application of no tensile force and under application of a tensile force to calculate an amount of peak shift caused by application of the tensile force, and evaluating stress in the rubber specimen from the amount of peak shift.

As shown in FIGS. 1 to 6, specific peaks shift when an infrared absorption spectrum is measured under application of a tensile force. The evaluation method utilizes this phenomenon to evaluate stress in a rubber specimen. Moreover, the evaluation method uses the infrared absorption spectra measured by infrared spectroscopy, which enables evaluation of stress on a bond which is difficult to detect by Raman spectroscopy.

Also as shown in FIGS. 1 to 6, when a tensile force is applied, some bonds exhibit large peak shifts, and some bonds exhibit small peak shifts. Thus, the evaluation method may use the amount of peak shift to estimate the location of stress generated in the rubber specimen or to estimate the magnitude of stress generated in the rubber specimen. Moreover, the use of these features is expected to contribute to developing rubber materials which are less susceptible to stress concentration, i.e., which are more resistant to breakage.

Figure 1:
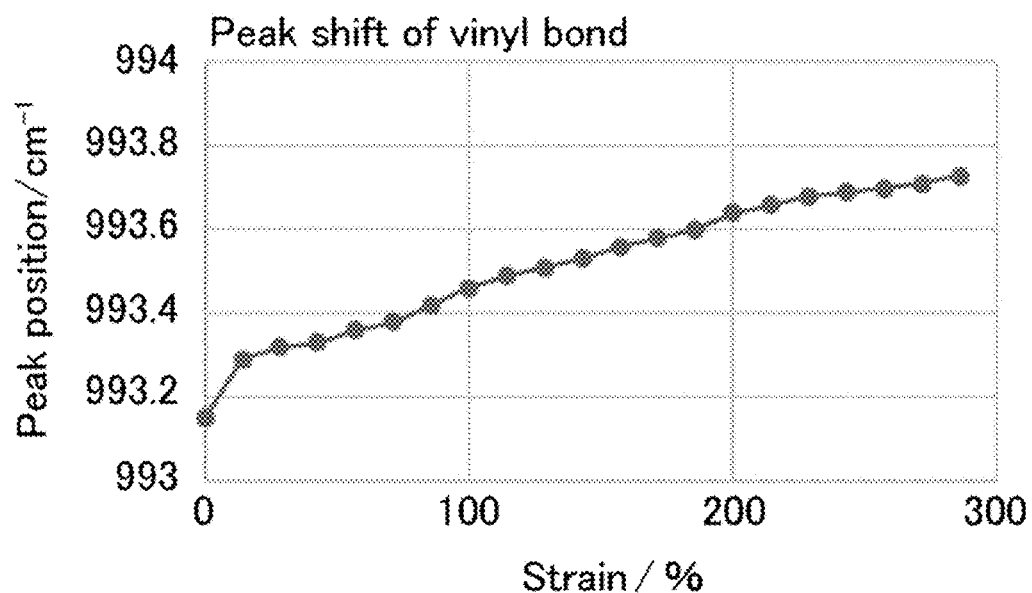
FIG. 1 is a graph showing the relationship between strain and the peak position of the vinyl bond in rubber specimen 1.

Furthermore, the peak shifts caused by application of a tensile force basically occur towards the high wavenumber side as shown in FIG. 1. This is believed to be attributed to steric or electronic restriction of molecular vibration caused by loosening of the polymer chains or a change in the dihedral angle of the bonds.

When the distance between bonded atoms in the polymer is extended by the tensile force, the spring constant will decrease, resulting in a peak shift towards the low wavenumber side.

The infrared absorption spectra may be measured by Fourier transform infrared spectroscopy (FT-IR), for example. To obtain sharper peaks, the infrared absorption spectra are preferably second derivative spectra.

FT-IR measurements are roughly classified into transmission and reflection types. Transmission FT-IR is preferred because of the high measurement accuracy. In other words, the infrared absorption spectra are preferably measured by transmission FT-IR.

The measurement conditions of FT-IR are not limited. Usually, the measurement range is 4,000 to 400 $cm^{-1}$, the measurement temperature is 15 to 25° C., and the number of scans is 8 to 128, preferably 8 to 64.

The tensile force applied to the rubber specimen may be uniaxial or biaxial, preferably uniaxial. For example, a uniaxial tensile force may be applied by holding the rubber specimen between a pair of opposing tensile jigs and then allowing the tensile jigs to pull the rubber specimen in the respective opposite directions, or alternatively by holding the rubber specimen between a pair of opposing tensile jigs and then allowing one of the tensile jigs to pull the rubber specimen while fixing the other jig.

Although the rubber specimen may be in any shape, a preferred shape is a plate or a dumbbell shape set forth in JIS K6251 because such a shape facilitates application of a uniform tensile force.

The rubber specimen preferably has a thickness at which transmission FT-IR can be performed. Specifically, the thickness is preferably 20 µm or less, more preferably 15 µm or less, but is preferably 1 µm or more, more preferably 5 µm or more.

Examples of rubber components that may be contained in the rubber specimen include diene rubbers such as isoprene-based rubbers, styrene-butadiene rubbers (SBR), polybutadiene rubbers (BR), acrylonitrile-butadiene rubbers (NBR), chloroprene rubbers (CR), butyl rubbers (IIR), and styrene-isoprene-butadiene copolymer rubbers (SIBR). Each of these may be used alone, or two or more of these may be used in combination.

The rubber specimen may contain additives such as fillers, stearic acid, zinc oxide, sulfur, and vulcanization accelerators, in addition to the rubber components.

The rubber specimen can be prepared by a usual method. Specifically, for example, the rubber specimen may be prepared by kneading the compounding materials using a kneading machine such as a Banbury mixer or an open roll mill, and then vulcanizing the kneaded mixture.

EXAMPLES

The present disclosure will be specifically described by reference to examples. The examples are not intended to limit the scope of the present disclosure.

The chemicals used in the examples are listed below.
SBR: NS616 available from Zeon Corporation
BR: BR1250H available from Zeon Corporation
Stearic acid: TSUBAKI available from NOF Corporation
Zinc oxide: zinc oxide #2 available from Mitsui Mining & Smelting Co., Ltd.
Sulfur: 5% oil-treated powdered sulfur available from Tsurumi Chemical Industry Co., Ltd.
Vulcanization accelerator: NOCCELER NS (N-t-butyl-2-benzothiazole sulfenamide) available from Ouchi Shinko Chemical Industrial Co., Ltd.

<Preparation of Rubber Specimen>

According to the formulation shown in each table below, the materials other than the sulfur and vulcanization accelerator were kneaded using an open roll mill at 150° C. for five minutes to give a kneaded mixture. The sulfur and vulcanization accelerator were added to the kneaded mixture, and they were kneaded using an open roll mill at 80° C. for five minutes to give an unvulcanized rubber composition. The unvulcanized rubber composition was vulcanized at 170° C. to give a vulcanized rubber composition. Plate-like rubber specimens 1 and 2 were cut out from the respective vulcanized rubber compositions prepared as above. The rubber specimens 1 and 2 were cut out using a cryostat and a microtome, respectively. The vulcanization time and size (length×width×thickness) of rubber specimens 1 and 2 are described below. The vulcanization time is defined as t95.

(Rubber Specimen 1)
Vulcanization time: 35 minutes
Size: 1 cm×2 cm×12 µm (Rubber Specimen 2)
Vulcanization time: 20 minutes
Size: 1 cm×1.5 cm×10 µm

TABLE 1

| Rubber specimen 1 | (parts by mass) |
|---|---|
| SBR | 100 |
| Stearic acid | 2.0 |
| Zinc oxide | 2.0 |
| Sulfur | 0.6 |
| Vulcanization accelerator | 3.0 |

TABLE 2

| Rubber specimen 2 | (parts by mass) |
|---|---|
| BR | 100 |
| Stearic acid | 2.0 |
| Zinc oxide | 2.0 |
| Sulfur | 0.6 |
| Vulcanization accelerator | 3.0 |

<Measurement of Infrared Absorption Spectrum>

The infrared absorption spectra of rubber specimens 1 and 2 were measured by FT-IR under the following conditions. The measurements were carried out under application of no tensile force and under application of a tensile force. Moreover, the measurement under application of a tensile force was performed multiple times while varying the tensile force.

(Measurement Conditions)
Infrared spectrophotometer: Frontier available from PerkinElmer
Mode: transmission
Measurement range: 4,000 to 400 cm$^{-1}$
Number of scans: 32
Temperature: 23° C.

Figure 4:
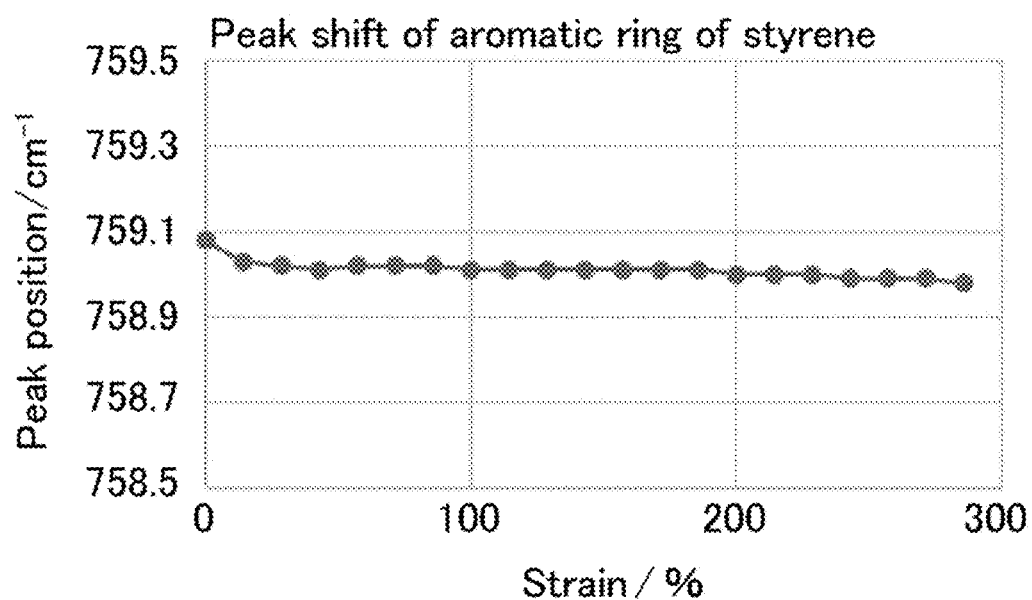
FIG. 4 is a graph showing the relationship between strain and the peak position of the aromatic ring of styrene in rubber specimen 1.
Figure 5:
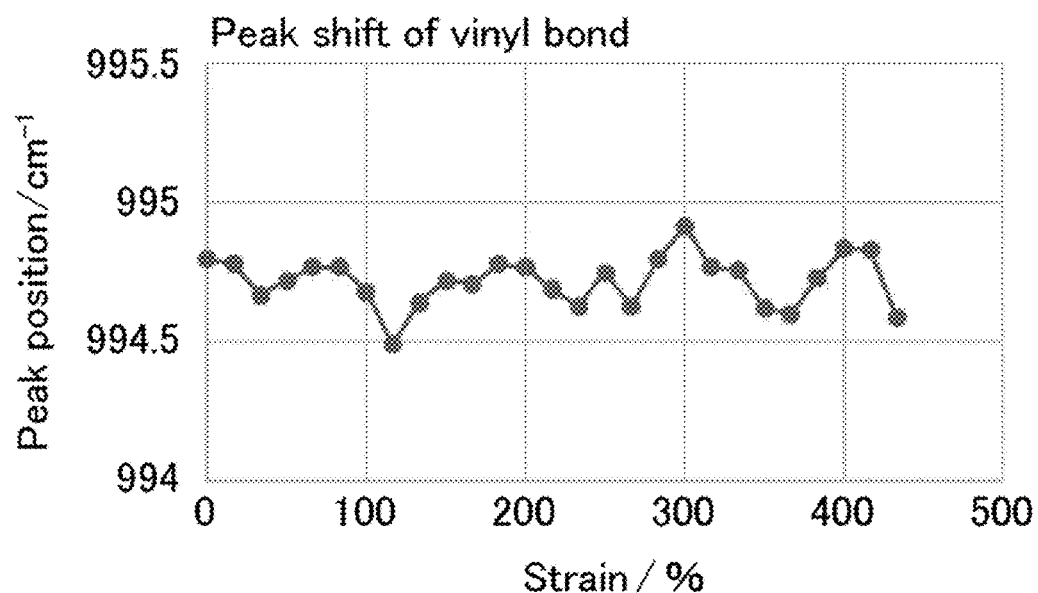
FIG. 5 is a graph showing the relationship between strain and the peak position of the vinyl bond in rubber specimen 2.
Figure 6:
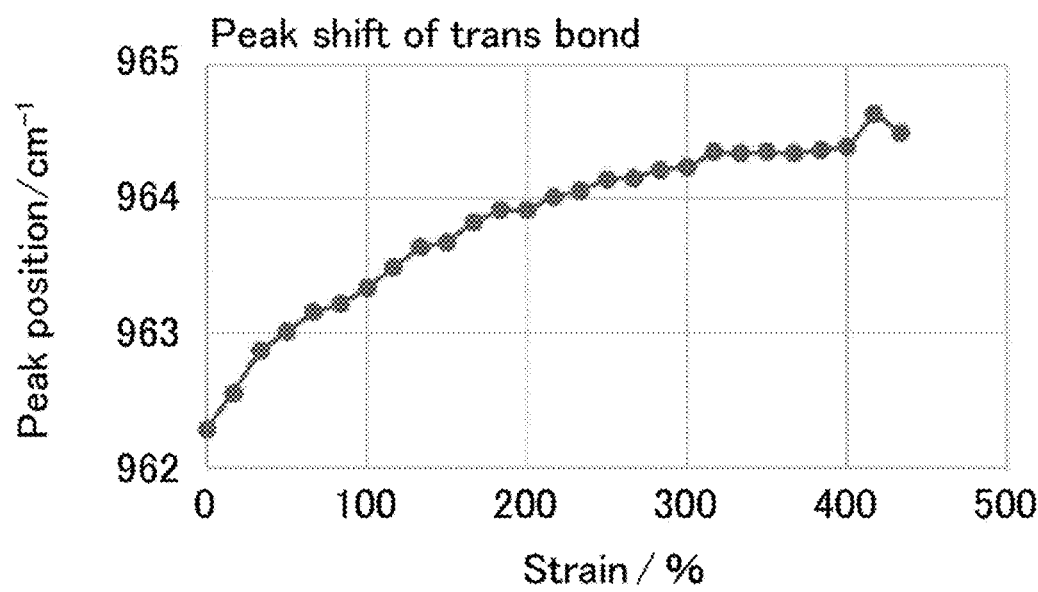
FIG. 6 is a graph showing the relationship between strain and the peak position of the trans bond in rubber specimen 2.

The infrared absorption spectra measured on each rubber specimen under application of no tensile force and under application of tensile forces were used to create graphs of the relationship between tensile force (strain) and peak position. The graphs based on the results of rubber specimen 1 are shown in FIGS. 1 to 4, and the graphs based on the results of rubber specimen 2 are shown in FIGS. 5 and 6.

Figure 2:
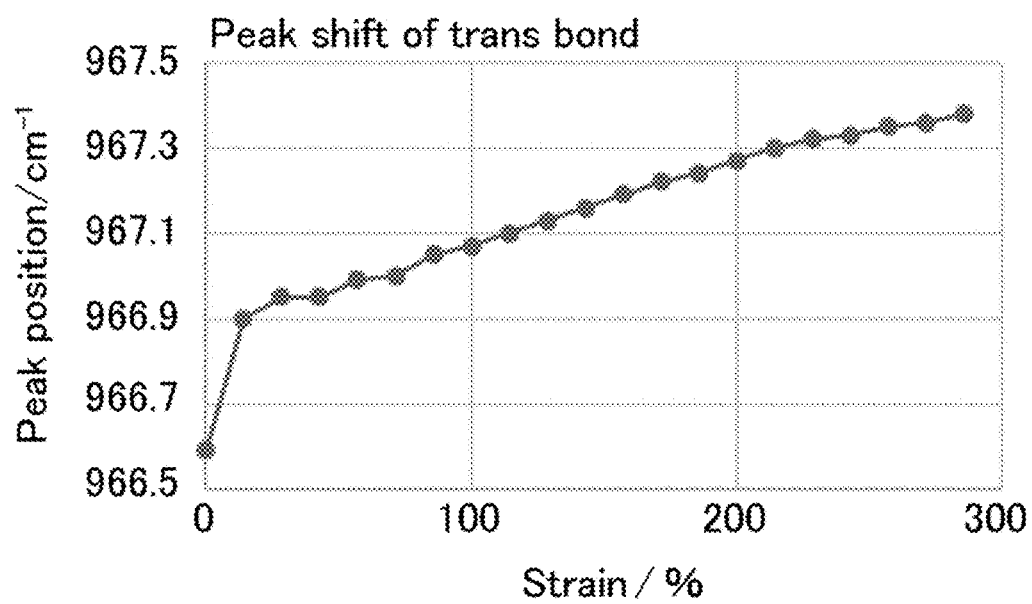
FIG. 2 is a graph showing the relationship between strain and the peak position of the trans bond in rubber specimen 1.

FIG. 1 is a graph showing the relationship between strain and the peak position of the vinyl bond in rubber specimen 1. FIG. 2 is a graph showing the relationship between strain and the peak position of the trans bond in rubber specimen 1. The graphs demonstrate that the peak positions of the vinyl and trans bonds shift towards the high wavenumber side as the strain increases.

Figure 3:
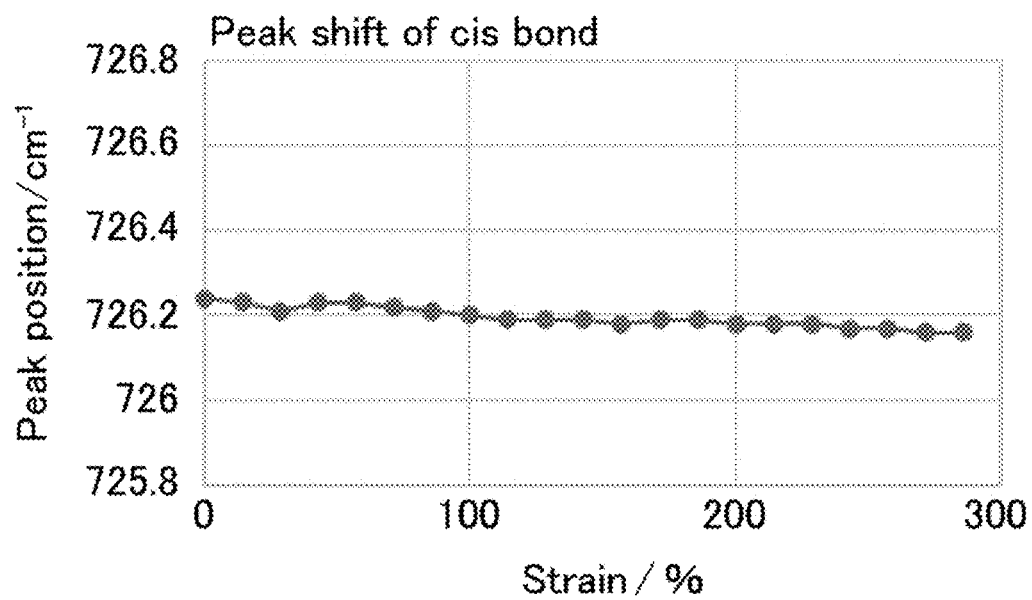
FIG. 3 is a graph showing the relationship between strain and the peak position of the cis bond in rubber specimen 1.

Moreover, FIG. 3 is a graph showing the relationship between strain and the peak position of the cis bond in rubber specimen 1. FIG. 4 is a graph showing the relationship between strain and the peak position of the aromatic ring of styrene in rubber specimen 1. The graphs demonstrate that the peak positions of the cis bond and styrene do not change much as the strain increases.

The above results suggest that, in rubber specimen 1 under application of a tensile force, stress is mainly generated in the vinyl and trans bond portions.

FIG. 5 is a graph showing the relationship between strain and the peak position of the vinyl bond in rubber specimen 2. FIG. 6 is a graph showing the relationship between strain and the peak position of the trans bond in rubber specimen 2. The graphs demonstrate that the peak position of the vinyl bond does not change much as the strain increases, and that the peak position of the trans bond shifts towards the high wavenumber side as the strain increases.

The above results suggest that, in rubber specimen 2 under application of a tensile force, stress is mainly generated in the trans bond portion.

Moreover, when the peak position shifts as the strain increases, as shown in FIGS. 1, 2, and 6, stress can be estimated by determining the relationship between strain and stress and then the relationship between the amount of peak shift and strain, and using these relationships to determine the relationship between the amount of peak shift and stress.

Exemplary embodiments of the present disclosure include:

Embodiment 1. An evaluation method, including:

using infrared absorption spectra measured on a rubber specimen under application of no tensile force and under application of a tensile force to calculate an amount of peak shift caused by application of the tensile force, and evaluating stress in the rubber specimen from the amount of peak shift.

Embodiment 2. The evaluation method according to Embodiment 1, wherein the amount of peak shift is used to estimate a location of stress generated in the rubber specimen.

Embodiment 3. The evaluation method according to Embodiment 1, wherein the amount of peak shift is used to estimate a magnitude of stress generated in the rubber specimen.

Embodiment 4. The evaluation method according to any one of Embodiments 1 to 3, wherein the infrared absorption spectra are measured by transmission Fourier transform infrared spectroscopy.

Embodiment 5. The evaluation method according to any one of Embodiments 1 to 4, wherein the rubber specimen has a thickness of 20 μm or less.

The invention claimed is:

1. An evaluation method, comprising
using infrared absorption spectra measured on a rubber specimen under application of no tensile force and under application of a tensile force to calculate an amount of peak shift caused by application of the tensile force, and
evaluating stress in the rubber specimen from the amount of peak shift,
wherein the rubber specimen comprises a diene rubber, and
wherein the infrared absorption spectra are measured in the measurement range of 4,000 to 400 $cm^{-1}$.

2. The evaluation method according to claim 1, wherein the amount of peak shift is used to estimate a location of stress generated in the rubber specimen.

3. The evaluation method according to claim 1, wherein the amount of peak shift is used to estimate a magnitude of stress generated in the rubber specimen.

4. The evaluation method according to claim 1, wherein the infrared absorption spectra are measured by transmission Fourier transform infrared spectroscopy.

5. The evaluation method according to claim 1, wherein the rubber specimen has a thickness of 20 μm or less.

* * * * *